United States Patent [19]

Tolksdorf et al.

[11] Patent Number: 4,735,489
[45] Date of Patent: Apr. 5, 1988

[54] DEVICE FOR ROTATING THE PLANE OF POLARIZATION OF LINEARLY POLARIZED LIGHT AND METHOD OF FABRICATION

[75] Inventors: Wolfgang F. M. Tolksdorf, Tornesch; Inske E. H. Bartels, Pinneberg; Gerd H. Passig, Barsbüttel, all of Fed. Rep. of Germany

[73] Assignee: U.S. Philips Corporation, New York, N.Y.

[21] Appl. No.: 861,956

[22] Filed: May 12, 1986

[30] Foreign Application Priority Data

May 17, 1985 [DE] Fed. Rep. of Germany ....... 3517785

[51] Int. Cl.⁴ ................................................ G02F 1/09
[52] U.S. Cl. .................................. 350/377; 350/96.13; 350/96.18; 350/375; 350/378; 350/416
[58] Field of Search ................ 350/370, 375, 376, 377, 350/378, 1.1, 96.13, 96.14, 96.18, 416

[56] References Cited

U.S. PATENT DOCUMENTS

| | | | |
|---|---|---|---|
| 3,784,281 | 1/1974 | Kose | 350/377 |
| 3,989,352 | 11/1976 | Lacklison et al. | 350/376 |
| 4,082,424 | 4/1978 | Sauter et al. | 350/375 |
| 4,143,939 | 3/1979 | Desormiere et al. | 350/375 |
| 4,304,461 | 12/1981 | Stewart et al. | 350/1.1 |
| 4,544,239 | 10/1985 | Shone et al. | 350/376 |
| 4,604,577 | 8/1986 | Matsumura et al. | 350/378 |

OTHER PUBLICATIONS

Sugie et al, "Nonreciprocal Circuit for Laser-Diode-to-Single-Mode-Fibre Courling Employing a Yig Sphere," *Electronics Letters*, vol. 18, No. 24, Nov. 25, 1982, pp. 1026-1028.

Klages, C., et al. "LPE Growth of Bismuth Substituted Gadolinium Iron Garnet Layers: Systematization of Experimental Results," *Journal of Crystal Growth*, vol. 64, pp. 275-284 (1983).

Okamoto, K., et al. "Novel Optical Isolator Consisting of a YIG Spherical Lens and Panda-Fibre Polarisers," *Electronics Letters*, vol. 21, No. 1, pp. 36-37 (Jan. 3, 1985).

Winkler, G. *Magnetic Garnets*, pp. 253-259 (Friedr. Vieweg & Sohn, Braunschweig, 1981).

*Primary Examiner*—John K. Corbin
*Assistant Examiner*—Martin Lerner
*Attorney, Agent, or Firm*—Jack E. Haken

[57] ABSTRACT

A focusing, adjustable device for rotating the plane of polarization of linearly polarized light in the form of a ball lens made from magnetic crystalline material preferentially magnetized in the direction of light transmission, where the ball lens consists of two domes of magnetic garnet material whose basal planes are oriented parallel to one antoher and perpendicular to the direction of light transmission, with a spherical member between the domes consisting of optically transparent non-magnetic garnet material.

24 Claims, 1 Drawing Sheet

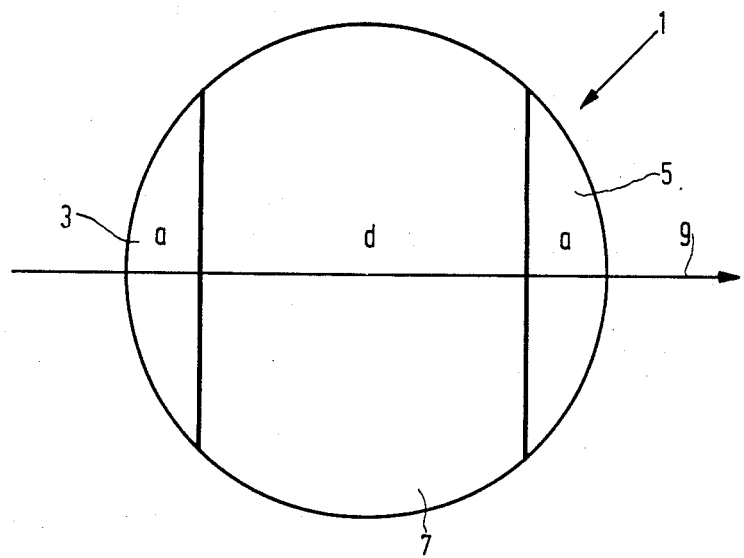

DEVICE FOR ROTATING THE PLANE OF POLARIZATION OF LINEARLY POLARIZED LIGHT AND METHOD OF FABRICATION

BACKGROUND OF THE INVENTION

The invention relates to a device for rotating the plane of polarization of linearly polarized light in the form of a ball lens using magnetic crystalline material preferentially magnetized in the direction of light transmission.

The invention also relates to a method of fabricating such a device and to its application.

Devices made from magnetic crystalline material for rotating the plane of polarization of linearly polarized light are generally referred to as Faraday rotators.

In optical communication systems operating with optical single-mode waveguides and a light source (e.g. a laser diode), passive components are required such as for example lenses for focusing the entering light beam, or for example optical isolators incorporating a Faraday rotator, which transmit the light only in one direction, while optically blocking the opposite direction. Such isolators find application for protecting the light source, e.g. a laser, against interfering reflections from the connected optical system.

The present invention relates to the combination of two passive components used among others for the construction of an optical communication system with singlemode waveguides and a light source (in the form of for example a laser diode), namely a combination of a focusing ball lens and a Faraday rotator for an optical isolator.

A combination of these functions in one component is known from Electronics Letters 18 (1982), No. 24, pages 1026 to 1028, which proposes a ball lens of yttrium-iron-garnet (YIG) not only as a Faraday rotator but also as a coupling lens in an optical communication system.

Ball lenses of YIG can only be made at relatively high cost, since in the first place they require the growth of large single-crystals from which the balls then have to be ground. A further drawback is that yttrium-iron-garnet has a relatively small Faraday rotation; a ball lens used for example to transmit a wavelength $\lambda = 1.3$ $\mu$m requires a ball diameter of 2.1 mm and thus requires considerable outlay to match it to the dimensions of optical waveguides used at the present time. Yet another disadvantage is that a relatively high magnetic field is required for the saturation magnetization of YIG.

Faraday rotators made from magnetic garnet material such as yttrium-gallium-iron-garnet $Y_3(Ga, Fe)_5O_{12}$ or from bismuth-substituted rare-earth metal iron garnet, for example $(Gd, Bi)_3(Ga, Fe, Al)_5O_{12}$, are characterized by a high Faraday rotation $\theta_F$ (°/cm) combined with low optical losses in the near infrared. The Faraday rotation in the case of bismuth-substituted iron garnets is considerably larger than that of YIG (in this connection reference is made for example to G. Winkler, Magnetic Garnets, Vieweg, Braunschweig 1981, pages 253 et seq.).

These crystals have the disadvantage, however, that their Faraday rotation, owing to dispersion, is dependent on the wavelength of the incoming light. This means, for example, for an isolator, that the damping in the blocked direction, that is to say the ability to suppress interfering reflections from an optical system, is wavelength-dependent. If a high damping in the blocked direction is required, relatively little variation of the wavelength is possible. Consequently, the Faraday rotator, and hence the optical isolator built with it, can only be used in a spectral range of limited bandwidth. Since the spectral region in the near infrared from about 0.8 to 1.6 $\mu$m has acquired considerable importance for optical data transmission using optical waveguides, this is a particularly serious drawback.

SUMMARY OF THE INVENTION

The object of the invention is to provide a device of the aforementioned kind whose Faraday rotation in the wavelength region of the near infrared (1.1 $\mu$m = $\lambda$ = 1.6 $\mu$m) can be adjusted to the wavelength of the light, which can be economically fabricated and whose dimensions can readily be matched to the dimensions of the optical waveguide to be coupled to it.

This object is achieved by means of the invention in that a ball lens consisting of two domes with basal planes oriented parallel to each other and perpendicular to the direction of light transmission is made of magnetic garnet material with a spherical member between the domes consisting of optically transparent non-magnetic garnet material.

A method of fabricating such a device is characterized in that equally thick layers of magnetic garnet material are epitaxially deposited on the main surfaces of a substrate consisting of optically transparent non-magnetic garnet material. The coated substrate is then sawn into cubes, and the cubes are ground to form spheres.

According to advantageous further embodiments of the invention the domes consist of preferentially, bismuth-doped rare-earth metal iron garnet. The domes consist, preferentially, of rare-earth metal iron garnet with the general formula $(Gd, Bi)_3(Fe, Ga, Al)_5O_{12}$.

According to a further advantageous embodiment of the invention the spherical member consists of nonmagnetic garnet material whose composition corresponds to the formula $(A, B)_3(Ga, C, D)_5O_{12}$ with A = Gd and/or Sm and/or Y
B, C = Ca and/or Sr and/or Mg
D = Zr and/or Sn.

The spherical member between the domes consists preferentially of non-magnetic garnet material according to the formula $(Gd, Ca)_3(Ga, Mg, Zr)_5O_{12}$.

In accordance with a further advantageous embodiment of the invention the domes have a maximum overall layer thickness that is sufficient to rotate the plane of polarization of the entering light beam by more than 45°.

The advantages achieved with the invention consist in particular in the provision of a focusing Faraday rotator which can be used for building a Faraday isolator, which is adjustable and can therefore be matched to different wavelengths of the light.

Since the magnetooptically effective material is employed in the form of epitaxial layers, the Faraday rotator in the form of a ball lens in accordance with the invention can be fabricated at exceptionally low cost.

A further advantage is that, in consequence of the use of bismuth-doped iron-garnet, which has a higher Faraday rotation than for example YIG, the Faraday rotator can be given relatively small dimensions that can readily be matched to the dimensions of the optical waveguide to be coupled to it.

BRIEF DESCRIPTION OF THE DRAWING

An example of an embodiment of the invention will now be described and its function explained on the basis of the drawing which schematically shows the device for rotating the plane of polarization according to the invention.

DESCRIPTION OF THE PREFERRED EMBODIMENTS

The FIGURE shows a ball lens 1 in cross-section with two domes 3, 5 consisting of magnetooptically active iron-garnet material and a spherical member 7 consisting of non-magnetic garnet material located between the domes 3, 5. The arrow 9 indicates the direction of the preferential magnetization of the magnetic material of the domes 3 and 5. The maximum layer thickness of the domes 3 and 5 is indicated by a, while d indicates the layer thickness of the spherical member 7 between the domes.

The ball lens 1 can be arranged in the known way (see for example Electronics Letters 18 (1982), pages 1026 to 1028) in an optical communication system in the beam of a laser diode/single-mode waveguide. The ball lens 1 functions as a focusing optical isolator in conjunction with a polarizer located between the ball lens and the single-mode waveguide and a magnetizing device whose magnetic field passes through the domes 3 and 5 in the direction of light propagation and brings about the saturation magnetization. In the direction of the maximum thickness a of the domes 3 and 5 a growth-induced magnetic anisotropy exists. By a slight rotation of this direction away from the optical axis of the laser diode/single-mode waveguide system the effective thickness of the magnetic material of the domes, and hence the magnetooptical rotation, is reduced and thereby matched to the wavelength of the light.

The ball lens 1 shown in the FIGURE is fabricated as follows: From a melt with the composition

| Pb | 0.3874 | (Molar contributions of the cations in the melt) |
|----|--------|--------|
| B  | 0.1220 | |
| Gd | 0.0074 | |
| Bi | 0.3463 | |
| Fe | 0.1225 | |
| Al | 0.0082 | |
| Ga | 0.0062 | |
|    | 1.0000 | | at a saturation temperature $T_S$ of 819° C., layers with a composition corresponding to the formula $(Gd, Bi)_3(Fe, Ga, Al)_5O_{12}$ each 160 μm thick were epitaxially grown on horizontally disposed 0.55 mm thick (111)—oriented $(Gd, Ca)_3(Ga, Mg, Zr)_5O_{12}$ monocrystalline substrates of 30 mm diameter in accordance with the liquidphase epitaxial procedure described in the Journal of Crystal Growth 64 (1983) pages 275 to 284. It should be noted here that, although a solvent in the form of PbO and $B_2O_3$ was used, the boron and lead incorporated in the growing layer is so small as to be negligible.

From the coated substrates, cubes of 0.87 mm edge length were sawn, rounded in eccentrically rotating grinding heads and polished in cages between crossed rotating discs. The resulting spheres had a total diameter $D=d+2a$ of 0.8 mm and the domes 3 and 5 had a maximum layer thickness of a=0.125 mm (see FIGURE). The Faraday rotation at a wavelength $\lambda = 1.3$ μm was $1.9 \times 10^{3°}/cm$. The saturation magnetization $M_S$ was 17 mT (at 20° C.).

What is claimed is:

1. Device for rotating the plane of polarization of linearly polarized light in the form of a ball lens made from magnetic crystalline material preferentially magnetized in the direction of light transmission, characterized in that the ball lens (1) consists of two domes (3, 5) whose basal planes are parallel to one another and perpendicular to the direction of light transmission aand which are made from magnetic garnet material, with a spherical member (7) of optically transparent non-magnetic garnet material between the domes.

2. Device as claimed in claim 1, characterized in that the domes (3, 5) consist of rare-earth metal iron garnet.

3. Device as claimed in claim 2, characterized in that the domes (3, 5) consist of bismuth-substituted rare-earth metal iron garnet.

4. Device as claimed in claim 3, characterized in that the domes (3, 5) consist of rare-earth metal iron garnet according to the general formula $(Gd, Bi)_3(Fe, Ga, Al)_5O_{12}$.

5. Device as claimed in claim 1, characterized in that the spherical member (7) between the domes (3, 5) consists of garnet material whose composition corresponds to the formula $(A, B)_3(Ga, C, D)_5O_{12}$ with
A = Gd and/or Sm and/or Y
B,C = Ca and/or Sr and/or Mg
D = Zr and/or Sn.

6. Device as claimed in claim 5, characterized in that the spherical member (7) between the domes (3, 5) consists of garnet material in accordance with the general formula $(Gd, Ca)_3(Ga, Mg, Zr)_5O_{12}$.

7. Device as claimed in claim 6, characterized in that the domes (3, 5) consist of rare-earth metal iron garnet according to the formula $(Gd, Bi)_3(Fe, Ga, Al)_5O_{12}$ and the spherical member (7) between the domes consists of garnet material according to the formula $(Gd, Ca)_3(Ga, Mg,Zr)_5O_{12}$.

8. Device as claimed in claim 7, characterized in that the domes (3, 5) have a maximum overall thickness that is sufficient to rotate the plane of polarization of the light by more than 45°.

9. Method of fabricating a device in accordance with claim 1, characterized in that equally thick layers of magnetic garnet material are grown epitaxially on the main surfaces of an optically transparent non-magnetic garnet substrate, which is then sawn into cubes which are subsequently ground to form spheres.

10. Method as claimed in claim 9, characterized in that layers of rare-earth metal iron garnet are grown on the substrate.

11. Method as claimed in claim 10, characterized in that bismuth-substituted layers of rare-earth metal iron garnet are grown.

12. Method as claimed in claim 11, characterized in that layers are grown whose composition corresponds to the formula $(Gd, Bi)_3(Fe, Ga, Al)_5O_{12}$.

13. Method as claimed in any one of claims 9 to 12, characterized in that the layers of magnetic garnet material are grown epitaxially on a substrate of garnet material corresponding to the general formula $(A, B)_3(Ga, C, D)_5O_{12}$ with
A = Gd and/or SM and/or Y
B,C = Ca and/or Sr and/or Mg
D = Zr and/or Sn.

14. Method as claimed in claim 13, characterized in that the layers are grown on a substrate whose composition corresponds to the formula $(Gd, Ca)_3(Ga, Mg, Zr)_5O_{12}$.

15. Method as claimed in claim 14, characterized in that layers whose composition corresponds to the formula $(Gd, Bi)_3(Fe, Ga, Al)_5O_{12}$ are grown epitaxially on the upper and lower surfaces of a substrate whose composition corresponds to the formula $(Gd, Ca)_3(Ga, Mg, Zr)_5O_{12}$.

16. Method as claimed in claim 15, characterized in that the thickness of the epitaxially grown magneto-optically active layers is so chosen that the maximum overall layer thickness of the domes resulting from the grinding and polishing process is sufficient to rotate the plane of polarization of the light by more than 45°.

17. Application of the device as claimed in claim 1 in an optical isolator for the wavelength region $1.1 \leq \lambda \leq 1.6$ μm.

18. A device for rotating the plane of polarization of linearly polarized light, said device comprising:
   an optically transparent, nonmagnetic garnet substrate having first and second substantially planar surfaces, said first and second surfaces being arranged on opposite sides of the substrate;
   a first layer of magnetic crystalline material arranged on the first surface of the substrate, said first layer having a substantially spherical surface arranged opposite the substrate; and
   a second layer of magnetic crystalline material arranged on the second surface of the substrate, said second layer having a substantially spherical surface arranged opposite the substrate.

19. A device as claimed in claim 18, characterized in that the spherical surfaces of the first and second layers have radii of curvature, and the radii of curvature of the spherical surfaces are equal to each other.

20. A device as claimed in claim 19, characterized in that the first and second surfaces of the substrate are substantially parallel to each other.

21. A device as claimed in claim 20, characterized in that the first layer has a maximum thickness and the second layer has a maximum thickness substantially equal to the maximum thickness of the first layer.

22. A device as claimed in claim 21, characterized in that the magnetic crystalline material consists essentially of a rare-earth metal iron garnet.

23. A device for rotating the plane of polarization of linearly polarized light, said device comprising:
   an optically transparent, nonmagnetic garnet substrate having first and second substantially planar surfaces, said first and second surfaces being substantially parallel to each other and being arranged on opposite sides of the substrate, said substrate having an optical axis substantially perpendicular to the first and second surfaces of the substrate;
   a first layer of magnetic crystalline material arranged on the first surface of the substrate, said first layer having a substantially spherical surface arranged opposite the substrate;
   a second layer of magnetic crystalline material arranged on the second surface of the substrate, said second layer having a substantially spherical surface arranged opposite the substrate; and
   means for passing a light beam through the first and second layers and the substrate in a direction not parallel to the optical axis.

24. A method of manufacturing a device for rotating the plane of polarization of linearly polarized light, said method comprising the steps of:
   providing an optically transparent, nonmagnetic garnet substrate having first and second substantially planar surfaces, said first and second surfaces being arranged on opposite sides of the substrate;
   epitaxially growing a first layer of magnetic crystalline material on the first surface of the substrate;
   epitaxially growing a second layer of magnetic crystalline material on the second surface of the substrate;
   cutting the substrate bearing the first and second layers into cubes, each cube comprising a substrate with first and second layers on opposite sides thereof; and
   grinding the cubes into spheres.

* * * * *